US012289407B2

United States Patent
Xing

(10) Patent No.: US 12,289,407 B2
(45) Date of Patent: Apr. 29, 2025

(54) KEY MANAGEMENT METHOD, KEY MANAGEMENT DEVICE AND STORAGE MEDIUM

(71) Applicant: SUZHOU METABRAIN INTELLIGENT TECHNOLOGY CO., LTD., Jiangsu (CN)

(72) Inventor: Xishuang Xing, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/714,541

(22) PCT Filed: Sep. 30, 2022

(86) PCT No.: PCT/CN2022/123406
§ 371 (c)(1),
(2) Date: May 29, 2024

(87) PCT Pub. No.: WO2023/236397
PCT Pub. Date: Dec. 14, 2023

(65) Prior Publication Data
US 2024/0333499 A1    Oct. 3, 2024

(30) Foreign Application Priority Data
Jun. 7, 2022   (CN) .............................. 202210632073

(51) Int. Cl.
*H04L 9/08*   (2006.01)
(52) U.S. Cl.
CPC .......... *H04L 9/0894* (2013.01); *H04L 9/0819* (2013.01)
(58) Field of Classification Search
CPC ........................... H04L 9/0894; H04L 9/0819
See application file for complete search history.

(56) References Cited

U.S. PATENT DOCUMENTS 10,430,350 B1   10/2019  Nimry et al.
10,615,968 B1 *  4/2020  Byrne ................. G06F 16/9027
(Continued)

FOREIGN PATENT DOCUMENTS

CN    102170440 A    8/2011
CN    109905384 A    6/2019
(Continued)

OTHER PUBLICATIONS

Chen, Weidong, et al. "Research and implementation of security kernel system for server system." Computer Applications and Software. 30.3 (2013).
(Continued)

*Primary Examiner* — Alexander Lagor
*Assistant Examiner* — Shu Chun Gao
(74) *Attorney, Agent, or Firm* — IPro, PLLC

(57) ABSTRACT

A secret-key managing method includes: constructing a multi-node secret-key storing system, in response to secret-key data required by an encryption-decryption service program being not in an operating state, storing the secret-key data into a random node in the multi-node secret-key storing system, and controlling the secret-key data to migrate among nodes in the multi-node secret-key storing system according to a predetermined migration rule, rather than directly storing in the internal memory corresponding to the encryption-decryption service program, the attacker cannot know the storage position of the secret-key data, and thus has difficulty in stealing the secret-key data with conventional attacking means. Moreover, when a secret-key invoking request based on the encryption-decryption service program is received, the storage position of the secret-key data at the current moment can be determined based on the predetermined migration rule, to feed back the secret-key invoking request.

17 Claims, 2 Drawing Sheets

(56) References Cited

U.S. PATENT DOCUMENTS

| | | | |
|---|---|---|---|
| 2008/0152151 A1 | 6/2008 | Pourzandi et al. | |
| 2010/0266132 A1 | 10/2010 | Bablani et al. | |
| 2014/0112470 A1 | 4/2014 | Shen et al. | |
| 2016/0154744 A1 | 6/2016 | Zheng et al. | |
| 2022/0069988 A1* | 3/2022 | Ong | H04L 9/0861 |
| 2023/0027329 A1* | 1/2023 | Durham | G06F 21/602 |

FOREIGN PATENT DOCUMENTS

| | | |
|---|---|---|
| CN | 109981576 A | 7/2019 |
| CN | 111654372 A | 9/2020 |
| CN | 112134699 A | 12/2020 |
| CN | 114710263 A | 7/2022 |
| WO | 2020168546 A1 | 8/2020 |

OTHER PUBLICATIONS

Xu, Zhen, et al. "Key management scheme in mobile scenario in wireless sensor networks." Journal of Henan University of Science and Technology (Natural Science). 41.3 (2020).

* cited by examiner

KEY MANAGEMENT METHOD, KEY MANAGEMENT DEVICE AND STORAGE MEDIUM

CROSS REFERENCE TO RELEVANT APPLICATIONS

The present application claims the priority of the Chinese patent application filed on Jun. 7, 2022 before the Chinese Patent Office with the application number of 202210632073.7 and the title of "KEY MANAGEMENT METHOD, KEY MANAGEMENT APPARATUS, KEY MANAGEMENT DEVICE AND STORAGE MEDIUM", which is incorporated herein in its entirety by reference.

FIELD

The present application relates to the technical field of security management, and relates to a secret-key managing method, a secret-key managing apparatus, a secret-key managing device and a non-transitory readable storage medium.

BACKGROUND

A secret-key managing system is usually designed to be an independent hardware (for example, a hardware-security module HSM), an independent system (for example, a secret-key managing system KMS) or an independent chip (for example, a safety chip TPM), to be independent of the operating system where the application programs are located, to reach sufficient safety. The secret-key managing system, by using specially designed hardware, can ensure permanent and safe storage of the secret key. However, once the secret key leaves the secret-key managing system, and resides and is operated in the internal memory, the protection on the secret key is insufficient. The encryption and decryption of the conventional service systems are usually realized by using software, in which case the secret key is buffered in the internal memory, which results in potential safety hazard.

SUMMARY

An object of the present application is to provide a secret-key managing method, a secret-key managing apparatus, a secret-key managing device and a non-transitory readable storage medium, to improve the safety of the secret key in the internal memory.

In order to solve the above technical problem, the present application provides a secret-key managing method, wherein the method includes:
  constructing a multi-node secret-key storing system;
  in response to secret-key data required by an encryption-decryption service program being not in an operating state, storing the secret-key data into a random node in the multi-node secret-key storing system, and controlling the secret-key data to migrate among nodes in the multi-node secret-key storing system according to a predetermined migration rule; and
  when a secret-key invoking request based on the encryption-decryption service program is received, determining a storage position of the secret-key data at a current moment based on the predetermined migration rule, to feed back the secret-key invoking request.

In some embodiments, the step of constructing the multi-node secret-key storing system includes:
  constructing a secret-key-buffer dynamic link library; and
  the step of receiving the secret-key invoking request based on the encryption-decryption service program includes:
    receiving the secret-key invoking request to an encryption-decryption-service deriving function of the secret-key-buffer dynamic link library based on the encryption-decryption service program.

In some embodiments, all of the random node and the nodes are internal-memory nodes.

In some embodiments, the step of constructing the multi-node secret-key storing system includes:
  constructing the multi-node secret-key storing system by using a high-usability cluster software.

In some embodiments, the step of storing the secret-key data into the random node in the multi-node secret-key storing system includes:
  replacing pseudo-data pre-stored in the random node with the secret-key data; and
  the step of controlling the secret-key data to migrate among the nodes in the multi-node secret-key storing system according to the predetermined migration rule includes:
    according to the predetermined migration rule, replacing the pseudo-data of a node where the secret-key data are located at the current moment with the secret-key data, and re-generating the pseudo-data at a node where the secret-key data are located at a previous moment.

In some embodiments, the nodes in the multi-node secret-key storing system are connected to each other with a tree structure or graph structure.

In some embodiments, the method further includes:
  receiving a configuration on the predetermined migration rule;
  wherein configuration items of the predetermined migration rule include at least one of a secret-key-data length, a secret-key-data encoding, a data-structure type, a quantity of the nodes included by the multi-node secret-key storing system, and a secret-key migration frequency.

In some embodiments, the method further includes:
  when a command of deleting the secret-key data is received or a storage time limit of the secret-key data is reached, replacing the secret-key data with predetermined data, and deleting the predetermined data.

In some embodiments, the step of storing the secret-key data into the random node in the multi-node secret-key storing system, and controlling the secret-key data to migrate among the nodes in the multi-node secret-key storing system according to the predetermined migration rule includes:
  storing the secret-key data into a random node in the multi-node secret-key storing system according to a type of the secret-key data, and controlling the secret-key data to migrate among the nodes in the multi-node secret-key storing system according to a predetermined migration rule corresponding to the secret-key data.

In some embodiments, the method further includes:
  when an attacking signal is detected, changing the predetermined migration rule.

In some embodiments, the step of, when the secret-key invoking request based on the encryption-decryption service program is received, determining the storage position of the secret-key data at the current moment based on the predetermined migration rule, to feed back the secret-key invoking request includes:

when the secret-key invoking request is received, verifying a validity of the encryption-decryption service program; and in response to the encryption-decryption service program having a validity, determining a storage position of the secret-key data at a current moment based on the predetermined migration rule, to feed back the secret-key invoking request.

In some embodiments, the secret-key data are a secret-key encrypting secret key of a data secret key required by encryption and decryption of the encryption-decryption service program.

In order to solve the above technical problem, the present application further provides a secret-key managing apparatus, and the apparatus includes:

a constructing unit configured for constructing a multi-node secret-key storing system;

a migration controlling unit configured for, in response to secret-key data required by an encryption-decryption service program being not in an operating state, storing the secret-key data into a random node in the multi-node secret-key storing system, and controlling the secret-key data to migrate among nodes in the multi-node secret-key storing system according to a predetermined migration rule; and an invoking unit configured for, when a secret-key invoking request based on the encryption-decryption service program is received, determining a storage position of the secret-key data at a current moment based on the predetermined migration rule, to feed back the secret-key invoking request.

In order to solve the above technical problem, the present application further provides a secret-key managing device, wherein the device includes:

a memory configured for storing a computer program; and a processor configured for executing the computer program, wherein the computer program, when executed by the processor, implements the steps of the secret-key managing method according to any one of the above embodiments.

In order to solve the above technical problem, the present application further provides a non-transitory readable storage medium, storing a computer program, wherein the computer program, when executed by a processor, implements the steps of the secret-key managing method according to any one of the above embodiments.

In the secret-key managing method according to the present application, by constructing a multi-node secret-key storing system, in response to secret-key data required by an encryption-decryption service program being not in an operating state, storing the secret-key data into a random node in the multi-node secret-key storing system, and controlling the secret-key data to migrate among nodes in the multi-node secret-key storing system according to a predetermined migration rule, rather than directly storing in the internal memory corresponding to the encryption-decryption service program, so that the attacker cannot know the storage position of the secret-key data, and cannot obtain the secret-key data by means of attacking the encryption-decryption service process and generating an internal-memory DUMP file as in conventional cases. Furthermore, because the secret-key data are always being migrated, they cannot be stolen because the internal memory where they are located have a low usage frequency and thus are transferred to an exchange partition, and the difficulty in directly searching the internal memory for the secret-key data by the attacker is further increased. Moreover, when a secret-key invoking request based on the encryption-decryption service program is received, based on the predetermined migration rule, the storage position of the secret-key data at the current moment can be determined to feed back the secret-key invoking request, so that the side of the encryption-decryption service program acquires the outputted secret-key data or acquires the secret-key data at the storage position of the secret-key data.

The present application further provides a secret-key managing apparatus, a secret-key managing device and a non-transitory readable storage medium, which have the above-described advantageous effects, and are not discussed further herein.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are merely embodiments of the present application, and a person skilled in the art can obtain other figures according to these figures without paying creative work.

DETAILED DESCRIPTION

The core of the present application is to provide a secret-key managing method, a secret-key managing apparatus, a secret-key managing device and a non-transitory readable storage medium, to improve the safety of the secret key in the internal memory.

The technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

Figure 1:
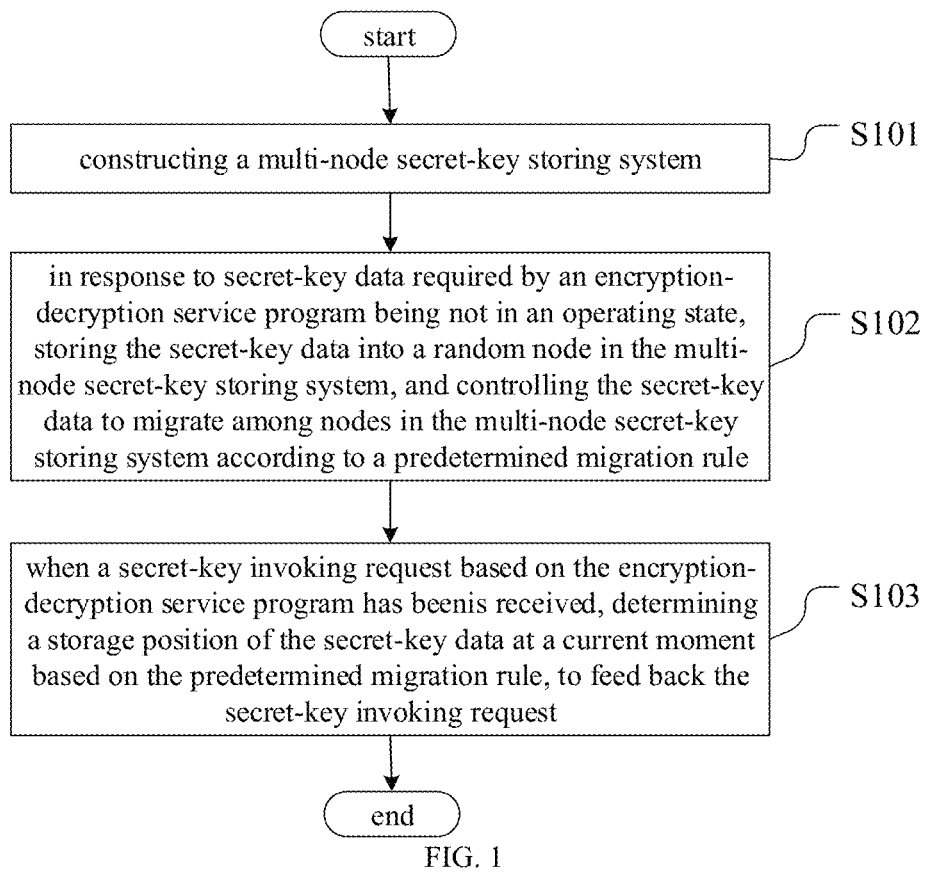
FIG. 1 is a flow chart of a secret-key managing method according to an embodiment of the present application.

In an illustrative embodiment of the present application:

FIG. 1 is a flow chart of a secret-key managing method according to an embodiment of the present application.

As shown in FIG. 1, the secret-key managing method according to an embodiment of the present application includes:

S101: constructing a multi-node secret-key storing system.

S102: in response to secret-key data required by an encryption-decryption service program being not in an operating state, storing the secret-key data into a random node in the multi-node secret-key storing system, and controlling the secret-key data to migrate among nodes in the multi-node secret-key storing system according to a predetermined migration rule.

S103: when a secret-key invoking request based on the encryption-decryption service program is received, determining a storage position of the secret-key data at a current moment based on the predetermined migration rule, to feed back the secret-key invoking request.

In the embodiments of the present application, the secret-key data may include but are not limited to the data secret key required by the encryption and decryption of the encryption-decryption service program, a secret-key encrypting secret key of the data secret key required by the encryption and decryption of the encryption-decryption service program, and the secret-key data of a more upper layer. In the embodiments of the present application, the secret-key data may include but are not limited to a symmetrical secret key and an asymmetrical secret key. In the embodiments of the present application, the secret-key data may be a secret key itself, and may also be a secret key in the form of ciphertext.

The secret-key managing method according to the embodiments of the present application may be implemented by creating and deploying a secret-key managing script in advance, and it is required to implement a storing task, a hiding task, a migrating task, a task of feeding back the encryption-decryption service program, and so on, to the secret-key data. When the attacker saw through the operation mechanism of the secret-key managing script, then the safety of the secret-key data is faced with a huge threat. In order to enhance the safety of the logic of the secret-key managing script, the secret-key managing script corresponding to the secret-key managing method according to the embodiments of the present application is implemented by using a code-obfuscation mechanism. Moreover, the secret-key managing script corresponding to the secret-key managing method according to the embodiments of the present application, when complied, turns on the address space randomization (referred to for short as ASLR) option. ASLR is a security protection technique used for buffer overflow, and is a technique that, by randomization of the layout of the linear regions such as heaps, stacks and shared library mappings, by increasing the difficulty in predicting the destination address by the attacker, prevents the attacker from directly locating and attacking the code position, to achieve the purpose of preventing overflow attack. By turning on the option of address space randomization, the address space randomization when the secret-key managing script is operating is ensured, to reduce the trend of the random access memory being attacked.

In S101, the step of constructing the multi-node secret-key storing system includes determining the information (at least including the address information) of the nodes and determining the predetermined migration rule.

In some embodiments, the multi-node secret-key storing system provides a plurality of virtual addresses or physical addresses for the migration of the secret-key data. The predetermined migration rule includes the migration sequence and the migration period of the secret-key data among the nodes, which may employ the default values, and may also be configured freely by the user.

The data structure formed by the nodes in the multi-node secret-key storing system is the basis of the migration sequence. When the nodes in the multi-node secret-key storing system employ a simpler structure such as a list structure, then the migration sequence is easily detected by the attacker. Therefore, the nodes in the multi-node secret-key storing system may be connected to each other by using a more complicated data structure such as a tree structure or a graph structure. Based on the data structure, it may be configured that the secret-key data are migrated among the nodes regularly, and it may also be configured that the secret-key data are migrated among the nodes randomly, to increase the migration randomness, to increase the difficulty in locating the secret-key data by the attacker.

The migration period of the secret-key data among the nodes may be a constant value, and may also be configured according to the current state of the usage of the system resource. In other words, when the system resource has a high occupancy rate, the migration period of the secret-key data is increased, to reduce the occupation of the system resource.

In S102, after the service-system server has acquired the secret key from the hardware-security module HSM, the secret-key managing system KMS or the safety chip TPM, when there is no encryption-decryption service program that requires using the secret-key data at the current moment, the secret key is not directly stored into the internal memory that is allocated to the encryption-decryption service program as in the prior art, but the secret key itself or the secret key that is processed is stored into the multi-node secret-key storing system, so as to save, hide and migrate the secret-key data. Because the secret-key data are always migrating in the multi-node secret-key storing system, the attacker has difficulty in determining the storage position of the secret-key data, and cannot obtain the secret-key data by means of attacking the encryption-decryption service process and generating an internal-memory DUMP file as in conventional cases. Furthermore, because the secret-key data are always being migrated, the storage space occupied by the secret-key data is not exchanged to the exchange partition of the hard disk by the internal-memory-exchange mechanism of the operating system, thereby preventing being moved to the exchange partition and stolen. Moreover, such a mechanism of random storing and migrating further increases the difficulty in directly searching the internal memory for the secret-key data by the attacker. Moreover, when a secret-key invoking request based on the encryption-decryption service program is received, based on the predetermined migration rule, the storage position of the secret-key data at the current moment can be determined to feed back the secret-key invoking request, so that the side of the encryption-decryption service program acquires the outputted secret-key data or acquires the secret-key data at the storage position of the secret-key data.

It can be understood that the secret-key data required by the encryption and decryption of different encryption-decryption service programs and the security level requirements of the secret-key data in different forms are different. Therefore, the secret-key data of different types may be processed pertinently. Accordingly, in S102, the step of storing the secret-key data into the random node in the multi-node secret-key storing system, and according to the predetermined migration rule, controlling the secret-key data to migrate among the nodes in the multi-node secret-key storing system may include: storing the secret-key data into a random node in the multi-node secret-key storing system according to a type of the secret-key data, and controlling the secret-key data to migrate among the nodes in the multi-node secret-key storing system according to a predetermined migration rule corresponding to the secret-key data. In other words, it is determined which multi-node secret-key storing systems the secret-key data are saved into according to the types of the secret-key data. Moreover, after the secret-key data are saved into the same secret-key storing system, different predetermined migration rules may be provided according to the types of the secret-key data. In some embodiments, the secret-key data that have a higher security level are saved into the multi-node secret-key storing system that has a more complicated data structure and a shorter migration period, to increase the difficulty in cracking by the attacker.

In addition, the secret-key managing method according to the embodiments of the present application may further include: receiving a configuration on the predetermined migration rule. The configuration items of the predetermined migration rule may include at least one of the secret-key-data length, the secret-key-data encoding, the data-structure type, the quantity of the nodes included by the multi-node secret-key storing system, and the secret-key migration frequency. The secret-key-data length is the size of the secret-key data, and the secret-key-data encoding is the encoding mode of the secret-key data. By configuring the predetermined migration rule by the user or the maintenance personnel, personalized management on different secret-key data is realized, to satisfy diversified service demands.

In S103, when the secret-key invoking request based on the encryption-decryption service program is received, the corresponding multi-node secret-key storing system is determined according to the type of the secret-key data required by the secret-key invoking request, subsequently the predetermined migration rule is determined according to the type of the secret-key data, the storage position of the secret-key data at the current moment is calculated according to the predetermined migration rule and the time point corresponding to the current moment, and the secret-key data are derived to be used by the encryption-decryption service program.

When the encryption-decryption service program is using the secret-key data, the secret-key data are temporarily stored in the buffer or in the internal memory corresponding to the encryption-decryption service program. Moreover, after the encryption-decryption service program has used the secret-key data, the secret-key data should be deleted from the local. Because the system internal memory usually employs virtual addresses, when the secret-key data are directly deleted, the secret-key data might still be stored in the corresponding physical address, at which point, they might be stolen by the attacker. Therefore, when the encryption-decryption service program executes the process of deleting the secret-key data from the local, it firstly replaces the secret-key data with predetermined data (usually resetting all of them to zero) and subsequently deletes them, thereby removing all of the traces of the secret-key data in the local.

In order to prevent the attacker from pretending the encryption-decryption service program to access the multi-node secret-key storing system, in S103, the step of, when the secret-key invoking request based on the encryption-decryption service program is received, determining the storage position of the secret-key data at the current moment based on the predetermined migration rule, to feed back the secret-key invoking request may include:

when the secret-key invoking request is received, verifying a validity of the encryption-decryption service program; and
in response to the encryption-decryption service program having a validity, determining a storage position of the secret-key data at a current moment based on the predetermined migration rule, to feed back the secret-key invoking request.

The step of verifying the validity of the encryption-decryption service program may include: when the secret-key invoking request is received, checking whether the secret-key invoking request includes an agreed password, in response to the secret-key invoking request including the agreed password, confirming that the encryption-decryption service program has a validity; and in response to the secret-key invoking request not including the agreed password, confirming that the encryption-decryption service program does not have a validity. The step of verifying the validity of the encryption-decryption service program may further include: when the secret-key invoking request is received, checking whether the encryption-decryption service program is an encryption-decryption service program that is registered at initialization of the multi-node secret-key storing system, in response to the encryption-decryption service program being the encryption-decryption service program that is registered at the initialization of the multi-node secret-key storing system, confirming that the encryption-decryption service program has a validity; and in response to the encryption-decryption service program being not the encryption-decryption service program that is registered at the initialization of the multi-node secret-key storing system, confirming that the encryption-decryption service program does not have a validity.

In order to further enhance the safety of the encryption-decryption service, the multi-node secret-key storing system does not permanently store the secret-key data. Accordingly, the secret-key managing method according to the embodiments of the present application may further include: when a command of deleting the secret-key data is received or a storage time limit of the secret-key data is reached, replacing the secret-key data with predetermined data, and deleting the predetermined data. In some embodiments, after a command of deleting the secret-key data that is sent by an upper-layer manager or the secret-key managing system is received, the secret-key data stored in the multi-node secret-key storing system are deleted. Alternatively, a storage time limit is set for the secret-key data, and, after it is detected that the storage time limit of the secret-key data is reached, the secret-key data stored in the multi-node secret-key storing system are automatically deleted.

Regarding the secret-key data provided with a storage time limit, usually they are secret-key data that are permanently used and periodically updated. Therefore, after the secret-key data that are updated are received, the secret-key data stored in the multi-node secret-key storing system may be automatically deleted.

In the same manner as the deletion of the secret-key data in the internal memory corresponding to the service system, in order to prevent that the secret-key data are deleted from the virtual address and still remain in the physical address, when the secret-key data stored in the multi-node secret-key storing system are being deleted, the secret-key data are firstly replaced with predetermined data (for example, all reset to zero) and subsequently deleted.

In an illustrative embodiment of the present application:
The multi-node secret-key storing system may be implemented in various forms. On the basis of the above embodiments, the embodiments of the present application provide a solution of implementing the multi-node secret-key storing system in the form of Dynamic Link Library (or Dynamic-link Library, referred to for short as DLL).

Accordingly, on the basis of the above embodiments, in the secret-key managing method according to the embodiments of the present application, in S101, the step of constructing the multi-node secret-key storing system includes: constructing a secret-key-buffer dynamic link library. In S103, the step of receiving the secret-key invoking request based on the encryption-decryption service program includes: receiving the secret-key invoking request to an encryption-decryption-service deriving function of the secret-key-buffer dynamic link library based on the encryption-decryption service program.

In the secret-key managing method according to the embodiments of the present application, the secret-key-buffer dynamic link library is introduced into the encryption-decryption service program, to specially serve for the saving, hiding and periodical migration of the secret key during the residence in the internal memory. The secret-key-buffer dynamic link library provides derived functions to the external, including a dynamic-library initializing function, a secret-key saving function, a secret-key inquiring function and a dynamic-library releasing function, for the interaction between the encryption-decryption service program and a secret-key-buffer dynamic library. The secret-key-buffer dynamic link library is provided with a periodical-migration internal mechanism, to automatically move the saved secret-key data among the internal-memory nodes of the internal data structure. The encryption-decryption service program allocates the internal memory, temporarily stores the secret-key data acquired from the secret-key managing system or the secret-key-buffer dynamic link library, after the encryption and decryption is completed, immediately buffers the secret-key data to the secret-key-buffer dynamic link library, and empties and releases the allocated internal memory.

In some embodiments, the encryption-decryption service program serves to execute the practical encryption-decryption function, temporarily store the secret-key data, and, after the usage has completed, immediately clean and release the related internal memory. The main process of the interaction between the encryption-decryption service program and the secret-key-buffer dynamic link library includes:

the encryption-decryption service program, at the starting-up, sets the configuring parameters of the secret-key-buffer dynamic link library, and initializes the secret-key-buffer dynamic link library.

The encryption-decryption service program, when requires using the secret-key data, firstly allocates the internal memory to the secret-key data, and subsequently inquires the secret-key data from the secret-key-buffer dynamic link library. When it acquires the secret-key data from the secret-key-buffer dynamic link library, it uses the secret-key data to execute the encrypting-decrypting operation. When the result returned from the secret-key-buffer dynamic link library is blank, then it acquires the secret-key data from an interface of the secret-key managing system to execute the encrypting-decrypting operation. The secret-key saving function invoking the secret-key-buffer dynamic link library buffers the secret-key data to the secret-key-buffer dynamic link library, empties the internal memory allocated to the secret-key data, and subsequently releases the internal memory allocated to the secret-key data.

The encryption-decryption service program, at the exiting, releases the secret-key-buffer dynamic link library.

The secret-key-buffer dynamic link library serves for the saving and the position migration of the secret-key data during the residence in the service-system server, and provides the derived functions to the encryption-decryption service program, which facilitates the interaction between the encryption-decryption service program and the secret-key-buffer dynamic link library. The main process and involved program modules include:

an initializing module configured for, according to the configuration of itself, determining the nodes used for saving the secret-key data and the data structure between the nodes, and creating the nodes into the multi-node secret-key storing system in the form of a dynamic link library;

a secret-key saving module configured for receiving the secret-key data of the encryption-decryption service program, and saving randomly the secret-key data provided by the encryption-decryption service program into one random node in the data structure distributed at the initialization of the secret-key-buffer dynamic link library;

a secret-key inquiring module configured for, after a secret-key invoking request based on the encryption-decryption service program is received, finding the node where data copying recently happens in the multi-node secret-key storing system, extracting the secret-key data therefrom, and transmitting to the encryption-decryption service program, subsequently, the secret-key data may continue to be migrated between the nodes according to the predetermined migration rule;

a secret-key migrating module configured for, according to a migration period configured for itself, migrating randomly the secret-key data among the internal-memory nodes of the multi-node secret-key storing system according to the predetermined migration rule, and copying the secret-key data at the current moment from the node where they are located to another node, where the original node does not have the secret-key data; and a releasing module configured for traversing the nodes that save the secret-key data, and sequentially emptying and releasing the internal-memory spaces of the nodes.

In an illustrative embodiment of the present application:

Besides the implementing of the multi-node secret-key storing system using dynamic link library according to the above embodiments, the secret-key management logic may also be implemented in other modes to construct the multi-node secret-key storing system. The secret-key management logic may be implemented by using an independent program, and the secret-key management logic may also be implemented directly based on a secret-key encrypting-decrypting program.

When the secret-key management logic is implemented by using an independent program, the encryption-decryption service program relies on a program protocol to communicate with the secret-key management logic, which is more complicated than the accessing by using a dynamic link library.

When the secret-key management logic is implemented directly based on a secret-key encrypting-decrypting program, it is required to modify the existing encryption-decryption service program to a large extent, but the encryption-decryption service program is not required to access another program in the execution, which can accelerate the acquirement of the secret-key data.

In order to facilitate the usage, in the multi-node secret-key storing system according to the embodiments of the present application, all of the random node and the nodes may be internal-memory nodes.

In an illustrative embodiment of the present application:

When the secret-key management logic is implemented by using an individual program, the secret-key managing script may be deployed in the service-system server, and the secret-key managing script may also be deployed in another server. When the secret-key managing script is deployed in another server, in S103, the step of, when the secret-key invoking request based on the encryption-decryption service program is received, determining the storage position of the secret-key data at the current moment based on the predetermined migration rule, to feed back the secret-key invoking request includes: when a secret-key invoking request sent by the service-system server is received, determining the storage position of the secret-key data at the current moment based on the predetermined migration rule, taking out the secret-key data, and sending to the service-system server.

In order to ensure the high usability of the secret-key managing service, in S101, the step of constructing the multi-node secret-key storing system includes: constructing the multi-node secret-key storing system by using a high-usability cluster software.

In some embodiments, the high-usability cluster software is used to construct a high-usability multi-node secret-key storing system at the selected node, and a host node is elected to interact with the service-system server. When the host node malfunctions, from the remaining nodes whose operation states are normal, a host node is re-elected to interact with the service-system server.

In an illustrative embodiment of the present application:

On the basis of the above embodiments, in order to further improve the safety of the secret-key data, in the secret-key managing method according to the embodiments of the present application, in S102, the step of storing the secret-key data into the random node in the multi-node secret-key storing system includes: replacing pseudo-data pre-stored in the random node with the secret-key data.

In S102, the step of controlling the secret-key data to migrate among the nodes in the multi-node secret-key storing system according to the predetermined migration rule includes: according to the predetermined migration rule, replacing the pseudo-data of a node where the secret-key data are located at the current moment with the secret-key data, and re-generating the pseudo-data at a node where the secret-key data are located at a previous moment.

In some embodiments, this step may include, at a node (the node here is referred to as the target node) that does not store the secret-key data currently in the multi-node secret-key storing system, generating the pseudo-data that have a length equal to the length of the secret-key data and the same encoding mode as the encoding mode of the secret-key data, when the secret-key data migrate to a certain node (that certain node here is referred to as the target node), replacing the pseudo-data in that node (that node here is the target node), and when the secret-key data migrate away, re-generating the pseudo-data. Because both of the length and the encoding mode of the pseudo-data are the same as those of the secret-key data, the attacker cannot distinguish the pseudo-data and the secret-key data from the features.

Accordingly, in the second embodiment of the present application, the initializing module of the secret-key-buffer dynamic link library, when executing the initializing process, generates the pseudo-data in the nodes. The secret-key saving module of the secret-key-buffer dynamic link library, after receiving the secret-key data, replaces the pseudo-data in the random node with the secret-key data. The secret-key migrating module is configured for, in the process of migrating the secret-key data, replacing the pseudo-data in the node that the secret-key data are migrated to with the secret-key data, and, after the secret-key data are migrated away, re-generating the pseudo-data in the node.

In an illustrative embodiment of the present application:

On the basis of the above embodiments, in order to further improve the safety of the secret-key data, the secret-key managing method according to the embodiments of the present application further includes: when an attacking signal is detected, changing the predetermined migration rule.

In an implementation, based on the existing security tool deployed in the service-system server, when the service-system server has detected an attacking signal, or, in the process of executing the secret-key managing script, receives a secret-key invoking request of an illegal service program, then both of them are considered as that an attacking signal is detected, and in this case the predetermined migration rule of the secret-key data in the multi-node secret-key storing system is changed, to increase the difficulty in attacking.

In addition, when an attacking signal is detected, a message of notifying that the secret-key data are attacked may be generated and sent to the security-management personnel or the service user, to prompt the security-management personnel or the user to change the predetermined migration rule by himself.

The embodiments corresponding to the secret-key managing method are described in detail above. On that basis, the present application further discloses a secret-key managing apparatus, a secret-key managing device and a non-transitory readable storage medium corresponding to the above-described method.

Figure 2:
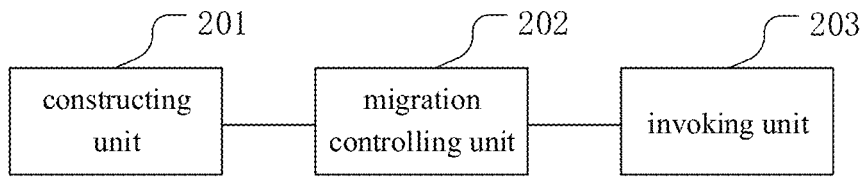
FIG. 2 is a schematic structural diagram of a secret-key managing apparatus according to an embodiment of the present application.

In an illustrative embodiment of the present application;

FIG. 2 is a schematic structural diagram of a secret-key managing apparatus according to an embodiment of the present application.

As shown in FIG. 2, the secret-key managing apparatus according to an embodiment of the present application includes:
  a constructing unit 201 configured for constructing a multi-node secret-key storing system;
  a migration controlling unit 202 configured for, in response to secret-key data required by an encryption-decryption service program being not in an operating state, storing the secret-key data into a random node in the multi-node secret-key storing system, and controlling the secret-key data to migrate among nodes in the multi-node secret-key storing system according to a predetermined migration rule; and
  an invoking unit 203 configured for, when a secret-key invoking request based on the encryption-decryption service program is received, determining a storage position of the secret-key data at a current moment based on the predetermined migration rule, to feed back the secret-key invoking request.

On that basis, the step of, by the constructing unit 201, constructing the multi-node secret-key storing system may include: constructing a secret-key-buffer dynamic link library; and
  the step of, by the invoking unit 203, receiving the secret-key invoking request based on the encryption-decryption service program may include: receiving the secret-key invoking request to an encryption-decryption-service deriving function of the secret-key-buffer dynamic link library based on the encryption-decryption service program.

In some embodiments, all of the random node and the nodes may be internal-memory nodes.

In some embodiments, the step of, by the constructing unit 201, constructing the multi-node secret-key storing system may include: constructing the multi-node secret-key storing system by using a high-usability cluster software.

On that basis, the step of, by the migration controlling unit 202, storing the secret-key data into the random node in the multi-node secret-key storing system may include: replacing pseudo-data pre-stored in the random node with the secret-key data; and the step of, by the migration controlling unit 202, controlling the secret-key data to migrate among the nodes in the multi-node secret-key storing system according to the predetermined migration rule may include: according to the predetermined migration rule, replacing the pseudo-data of a node where the secret-key data are located at the current moment with the secret-key data, and re-generating the pseudo-data at a node where the secret-key data are located at a previous moment.

In some embodiments, the nodes in the multi-node secret-key storing system are connected to each other with a tree structure or graph structure.

In some embodiments, the secret-key managing apparatus according to the embodiments of the present application may further include:

a receiving unit configured for receiving a configuration on the predetermined migration rule;

wherein configuration items of the predetermined migration rule include at least one of a secret-key-data length, a secret-key-data encoding, a data-structure type, a quantity of the nodes included by the multi-node secret-key storing system, and a secret-key migration frequency.

In some embodiments, the secret-key managing apparatus according to the embodiments of the present application may further include:

a deleting unit configured for, when a command of deleting the secret-key data is received or a storage time limit of the secret-key data is reached, replacing the secret-key data with predetermined data, and deleting the predetermined data.

In some embodiments, the step of, by the migration controlling unit 202, storing the secret-key data into the random node in the multi-node secret-key storing system, and controlling the secret-key data to migrate among the nodes in the multi-node secret-key storing system according to the predetermined migration rule includes: storing the secret-key data into a random node in the multi-node secret-key storing system according to a type of the secret-key data, and controlling the secret-key data to migrate among the nodes in the multi-node secret-key storing system according to a predetermined migration rule corresponding to the secret-key data.

In some embodiments, the secret-key managing apparatus according to the embodiments of the present application may further include:

a changing unit configured for, when an attacking signal is detected, changing the predetermined migration rule.

In some embodiments, the invoking unit 203 includes:

a verifying subunit configured for, when the secret-key invoking request is received, verifying a validity of the encryption-decryption service program; and in response to the encryption-decryption service program having a validity, entering the invoking subunit; and an invoking subunit configured for determining a storage position of the secret-key data at a current moment based on the predetermined migration rule, to feed back the secret-key invoking request.

In some embodiments, the secret-key data are a secret-key encrypting secret key of a data secret key required by encryption and decryption of the encryption-decryption service program.

Because the embodiments of the secret-key managing apparatus and the embodiments of the secret-key managing method correspond to each other, the embodiments of the secret-key managing apparatus may refer to the description on the embodiments of the secret-key managing method, and are not discussed further herein.

Figure 3:
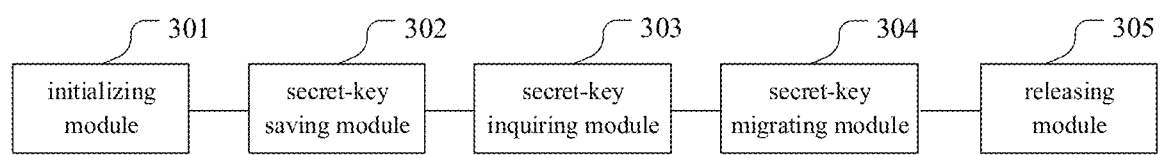
FIG. 3 is a schematic structural diagram of another secret-key managing apparatus according to an embodiment of the present application.

In an illustrative embodiment of the present application:

FIG. 3 is a schematic structural diagram of another secret-key managing apparatus according to an embodiment of the present application.

As shown in FIG. 3, the secret-key managing apparatus according to an embodiment of the present application includes:

an initializing module 301 configured for, according to the configuration of itself, determining the nodes used for saving the secret-key data and the data structure between the nodes, and creating the nodes into the multi-node secret-key storing system in the form of a dynamic link library;

a secret-key saving module 302 configured for receiving the secret-key data of the encryption-decryption service program, and saving randomly the secret-key data provided by the encryption-decryption service program into one random node in the data structure distributed at the initialization of the secret-key-buffer dynamic link library;

a secret-key inquiring module 303 configured for, after a secret-key invoking request based on the encryption-decryption service program is received, finding the node where data copying recently happens in the multi-node secret-key storing system, extracting the secret-key data therefrom, and transmitting to the encryption-decryption service program, wherein subsequently, the secret-key data may continue to be migrated between the nodes according to the predetermined migration rule;

a secret-key migrating module 304 configured for, according to a migration period configured for itself, migrating randomly the secret-key data among the internal-memory nodes of the multi-node secret-key storing system according to the predetermined migration rule, and copying the secret-key data at the current moment from the node where they are located to another node, wherein the original node does not have the secret-key data; and a releasing module 305 configured for traversing the nodes that save the secret-key data, and sequentially emptying and releasing the internal-memory spaces of the nodes.

Because the embodiments of the secret-key managing apparatus and the embodiments of the secret-key managing method correspond to each other, the embodiments of the secret-key managing apparatus may refer to the description on the embodiments of the secret-key managing method, and are not discussed further herein.

Figure 4:
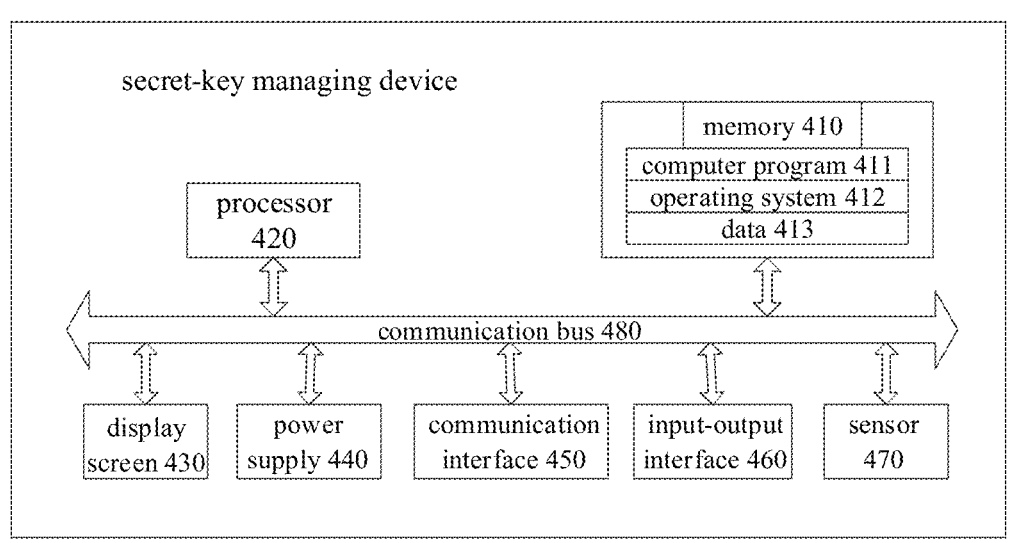
FIG. 4 is a schematic structural diagram of a secret-key managing device according to an embodiment of the present application.

In an illustrative embodiment of the present application:

FIG. 4 is a schematic structural diagram of a secret-key managing device according to an embodiment of the present application.

As shown in FIG. 4, the secret-key managing device according to the embodiments of the present application includes:

a memory 410 configured for storing a computer program 411; and a processor 420 configured for executing the computer program 411, wherein the computer program 411, when executed by the processor 420, implements the steps of the secret-key managing method according to any one of the above embodiments.

The processor 420 may include one or more processing cores, for example, a 3-core processor and an 8-core processor. The processor 420 may be implemented in at least one of the hardware forms of DSP (Digital Signal Processing). FPGA (Field-Programmable Gate Array) and PLA (Programmable Logic Array). The processor 420 may also include a host processor and a co-processor. The host processor refers to a processor that processes the data in the awakening state, and is also referred to as a CPU (Central Processing Unit). The co-processor refers to a low-power-consumption processor that processes the data in the standby state. In some embodiments, the processor 420 may be integrated with a GPU (Graphics Processing Unit), wherein the GPU is configured for rendering and drawing the contents that the display screen is required to display. In some embodiments, the processor 420 may further include an AI (Artificial Intelligence) processor, wherein the AI processor is configured for processing the calculating operations related to machine learning.

The memory 410 may include one or more non-transitory readable storage mediums, wherein the non-transitory readable storage mediums may be non-transient. The memory 410 may further include a high-speed random access memory and a non-transitory memory, for example, one or more magnetic-disk storage devices and flash-memory storage devices. In the present embodiment, the memory 410 is at least configured for storing the following computer program 411, wherein the computer program 411, after loaded and executed by the processor 420, can implement the relevant steps of the secret-key managing method according to any one of the above embodiments. Additionally, the resources stored by the memory 410 may further include an operating system 412, data 413 and so on, wherein the storage mode may be short-term storage or permanent storage. The operating system 412 may be Windows. The data 413 may include but are not limited to the data involved in the above-described method.

In some embodiments, the secret-key managing device may further include a display screen 430, a power supply 440, a communication interface 450, an input-output interface 460, a sensor 470 and a communication bus 480.

A person skilled in the art can understand that the structure shown in FIG. 4 does not limit the secret-key managing device, and the device may include components more or fewer than those illustrated.

The secret-key managing device according to the embodiments of the present application includes the memory and the processor, and the processor, when executing the program stored by the memory, can implement the secret-key managing method stated above, to obtain the same effects as those described above.

In an illustrative embodiment of the present application:

It should be noted that the above-described apparatus/device embodiments are merely illustrative. For example, the division between the modules is merely a division in the logic functions, and in the practical implementation there may be another mode of division. For example, multiple modules or components may be combined or may be integrated into another system, or some of the features may be omitted, or not implemented. Additionally, the coupling or direct coupling or communicative connection between the illustrated or discussed components may be via interfaces or the indirect coupling or communicative connection between the devices or modules, and may be electric, mechanical or in other forms. The modules that are described as separate components may or may not be physically separate, and the components that are displayed as modules may or may not be physical modules: in other words, they may be located at the same location, and may also be distributed to a plurality of network modules. Some or all of the modules may be selected according to practical demands to realize the purposes of the solutions of the embodiments.

Moreover, the function modules according to the embodiments of the present application may be integrated in one processing module, the modules may also physically exist separately, and two or more modules may also be integrated in one module. The above-described integrated module may be implemented in the form of hardware, and may also be implemented in the form of a software function module.

The integrated module, if implemented in the form of a software function module and sold or used as an independent product, may be stored in a non-transitory readable storage medium. On the basis of such a comprehension, the substance of the technical solutions of the present application, or the part thereof that makes a contribution over the prior art, or the whole or part of the technical solutions, may be implemented in the form of a software product. The computer software product is stored in a non-transitory readable storage medium, and implements all or some of the steps of the methods according to the embodiments of the present application.

Accordingly, an embodiment of the present application further provides a non-transitory readable storage medium, the non-transitory readable storage medium storing a computer program, wherein the computer program, when executed by the processor, implements the steps of the secret-key managing method stated above.

The non-transitory readable storage medium may include various mediums that can store a program code, such as a USB flash disk, a mobile hard disk drive, a ROM (Read-Only Memory), a RAM (Random Access Memory), a diskette and an optical disk.

The computer program contained by the non-transitory readable storage medium according to the embodiments of the present application can, when executed by a processor, implement the steps of the secret-key managing method stated above, to obtain the same effects as those described above.

The secret-key managing method, the secret-key managing apparatus, the secret-key managing device and the non-transitory readable storage medium according to the present application are described in detail above. The embodiments of the description are described in the mode of progression, each of the embodiments emphatically describes the differences from the other embodiments, and the same or similar parts of the embodiments may refer to each other. Regarding the apparatus, the device and the non-transitory readable storage medium according to the embodiments, because they correspond to the methods according to the embodiments, they are described simply, and the relevant parts may refer to the description on the methods. It should be noted that a person skilled in the art may make improvements and modifications on the present application without departing from the principle of the present application, and all of the improvements and modifications fall within the protection scope of the claims of the present application.

It should also be noted that, in the description, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The invention claimed is:

1. A secret-key managing method, wherein the method comprises:
    constructing a multi-node secret-key storing system;
    in response to secret-key data required by an encryption-decryption service program being not in an operating state, storing the secret-key data into a random node in the multi-node secret-key storing system, and controlling the secret-key data to migrate among nodes in the multi-node secret-key storing system according to a predetermined migration rule; wherein the predetermined migration rule comprises a migration sequence and a migration period of the secret-key data among the nodes; and
    when a secret-key invoking request based on the encryption-decryption service program is received, determining a storage position of the secret-key data at a current moment based on the predetermined migration rule, to feed back the secret-key invoking request;
    wherein the step of constructing the multi-node secret-key storing system comprises:
    constructing a secret-key-buffer dynamic link library; and
    the step of receiving the secret-key invoking request based on the encryption-decryption service program comprises:
    receiving the secret-key invoking request to an encryption-decryption-service deriving function of the secret-key-buffer dynamic link library based on the encryption-decryption service program;
    wherein the step of storing the secret-key data into the random node in the multi-node secret-key storing system comprises:
    replacing pseudo-data pre-stored in the random node with the secret-key data; and
    the step of controlling the secret-key data to migrate among the nodes in the multi-node secret-key storing system according to the predetermined migration rule comprises:
    according to the predetermined migration rule, replacing the pseudo-data of a node where the secret-key data are located at the current moment with the secret-key data, and re-generating the pseudo-data at a node where the secret-key data are located at a previous moment;
    wherein the step of, according to the predetermined migration rule, replacing the pseudo-data of the node where the secret-key data are located at the current moment with the secret-key data, and re-generating the pseudo-data at the node where the secret-key data are located at the previous moment comprises:
    at a target node that does not store the secret-key data currently in the multi-node secret-key storing system, generating the pseudo-data that have a length equal to a length of the secret-key data and a same encoding mode as an encoding mode of the secret-key data, replacing the pseudo-data at the target node when the secret-key data migrate to the target node, and re-generating the pseudo-data when the secret-key data migrate away from the target node.

2. The secret-key managing method according to claim 1, wherein all of the random node and the nodes are internal-memory nodes.

3. The secret-key managing method according to claim 1, wherein the step of constructing the multi-node secret-key storing system comprises:
    constructing the multi-node secret-key storing system by using a high-usability cluster software.

4. The secret-key managing method according to claim 1, wherein the nodes in the multi-node secret-key storing system are connected to each other with a tree structure or graph structure.

5. The secret-key managing method according to claim 1, wherein the method further comprises:
    receiving a configuration on the predetermined migration rule;
    wherein configuration items of the predetermined migration rule comprise at least one of a secret-key-data length, a secret-key-data encoding, a data-structure type, a quantity of the nodes comprised by the multi-node secret-key storing system, and a secret-key migration frequency.

6. The secret-key managing method according to claim 1, wherein the method further comprises:
    when a command of deleting the secret-key data is received or a storage time limit of the secret-key data is reached, replacing the secret-key data with predetermined data, and deleting the predetermined data.

7. The secret-key managing method according to claim 1, wherein the step of storing the secret-key data into the random node in the multi-node secret-key storing system, and controlling the secret-key data to migrate among the nodes in the multi-node secret-key storing system according to the predetermined migration rule comprises:
    storing the secret-key data into a random node in the multi-node secret-key storing system according to a type of the secret-key data, and controlling the secret-key data to migrate among the nodes in the multi-node secret-key storing system according to a predetermined migration rule corresponding to the secret-key data.

8. The secret-key managing method according to claim 1, wherein the method further comprises:
    when an attacking signal is detected, changing the predetermined migration rule.

9. The secret-key managing method according to claim 1, wherein the method further comprises:
    when an illegal secret-key invoking request is received, changing the predetermined migration rule.

10. The secret-key managing method according to claim 1, wherein the step of, when the secret-key invoking request based on the encryption-decryption service program is received, determining the storage position of the secret-key data at the current moment based on the predetermined migration rule, to feed back the secret-key invoking request comprises:
    when the secret-key invoking request is received, verifying a validity of the encryption-decryption service program; and
    in response to the encryption-decryption service program having a validity, determining a storage position of the secret-key data at a current moment based on the predetermined migration rule, to feed back the secret-key invoking request.

11. The secret-key managing method according to claim 10, wherein the step of verifying the validity of the encryption-decryption service program comprises:
when the secret-key invoking request is received, checking whether the secret-key invoking request comprises an agreed password; in response to the secret-key invoking request comprising the agreed password, confirming that the encryption-decryption service program has a validity; and in response to the secret-key invoking request not comprising the agreed password, confirming that the encryption-decryption service program does not have a validity.

12. The secret-key managing method according to claim 10, wherein the step of verifying the validity of the encryption-decryption service program comprises:
when the secret-key invoking request is received, checking whether the encryption-decryption service program is an encryption-decryption service program that is registered at initialization of the multi-node secret-key storing system; in response to the encryption-decryption service program being the encryption-decryption service program that is registered at the initialization of the multi-node secret-key storing system, confirming that the encryption-decryption service program has a validity; and in response to the encryption-decryption service program being not the encryption-decryption service program that is registered at the initialization of the multi-node secret-key storing system, confirming that the encryption-decryption service program does not have a validity.

13. The secret-key managing method according to claim 1, wherein the secret-key data are a secret-key encrypting secret key of a data secret key required by encryption and decryption of the encryption-decryption service program.

14. The secret-key managing method according to claim 1, wherein the secret-key data comprise a symmetrical secret key and an asymmetrical secret key; and/or
the secret-key data are a secret key itself, or a secret key in the form of ciphertext.

15. The secret-key managing method according to claim 1, wherein constructing a multi-node secret-key storing system comprises:
determining information of the nodes, and determining the predetermined migration rule, wherein the information at least comprises address information.

16. A secret-key managing device, wherein the device comprises:
a memory configured for storing a computer program; and
a processor configured for executing the computer program, wherein the computer program, when executed by the processor, implements operations:
constructing a multi-node secret-key storing system;
in response to secret-key data required by an encryption-decryption service program being not in an operating state, storing the secret-key data into a random node in the multi-node secret-key storing system, and controlling the secret-key data to migrate among nodes in the multi-node secret-key storing system according to a predetermined migration rule; wherein the predetermined migration rule comprises a migration sequence and a migration period of the secret-key data among the nodes; and
when a secret-key invoking request based on the encryption-decryption service program is received, determining a storage position of the secret-key data at a current moment based on the predetermined migration rule, to feed back the secret-key invoking request;
wherein the step of constructing the multi-node secret-key storing system comprises:
constructing a secret-key-buffer dynamic link library; and
the step of receiving the secret-key invoking request based on the encryption-decryption service program comprises:
receiving the secret-key invoking request to an encryption-decryption-service deriving function of the secret-key-buffer dynamic link library based on the encryption-decryption service program;
wherein the step of storing the secret-key data into the random node in the multi-node secret-key storing system comprises:
replacing pseudo-data pre-stored in the random node with the secret-key data; and
the step of controlling the secret-key data to migrate among the nodes in the multi-node secret-key storing system according to the predetermined migration rule comprises:
according to the predetermined migration rule, replacing the pseudo-data of a node where the secret-key data are located at the current moment with the secret-key data, and re-generating the pseudo-data at a node where the secret-key data are located at a previous moment;
wherein the step of, according to the predetermined migration rule, replacing the pseudo-data of the node where the secret-key data are located at the current moment with the secret-key data, and re-generating the pseudo-data at the node where the secret-key data are located at the previous moment comprises:
at a target node that does not store the secret-key data currently in the multi-node secret-key storing system, generating the pseudo-data that have a length equal to a length of the secret-key data and a same encoding mode as an encoding mode of the secret-key data, replacing the pseudo-data at the target node when the secret-key data migrate to the target node, and re-generating the pseudo-data when the secret-key data migrate away from the target node.

17. A non-transitory readable storage medium, storing a computer program, wherein the computer program, when executed by a processor, implements operations:
constructing a multi-node secret-key storing system;
in response to secret-key data required by an encryption-decryption service program being not in an operating state, storing the secret-key data into a random node in the multi-node secret-key storing system, and controlling the secret-key data to migrate among nodes in the multi-node secret-key storing system according to a predetermined migration rule; wherein the predetermined migration rule comprises a migration sequence and a migration period of the secret-key data among the nodes; and
when a secret-key invoking request based on the encryption-decryption service program is received, determining a storage position of the secret-key data at a current moment based on the predetermined migration rule, to feed back the secret-key invoking request;
wherein the step of constructing the multi-node secret-key storing system comprises:
constructing a secret-key-buffer dynamic link library; and
the step of receiving the secret-key invoking request based on the encryption-decryption service program comprises:

receiving the secret-key invoking request to an encryption-decryption-service deriving function of the secret-key-buffer dynamic link library based on the encryption-decryption service program;

wherein the step of storing the secret-key data into the random node in the multi-node secret-key storing system comprises:

replacing pseudo-data pre-stored in the random node with the secret-key data; and the step of controlling the secret-key data to migrate among the nodes in the multi-node secret-key storing system according to the predetermined migration rule comprises:

according to the predetermined migration rule, replacing the pseudo-data of a node where the secret-key data are located at the current moment with the secret-key data, and re-generating the pseudo-data at a node where the secret-key data are located at a previous moment;

wherein the step of, according to the predetermined migration rule, replacing the pseudo-data of the node where the secret-key data are located at the current moment with the secret-key data, and re-generating the pseudo-data at the node where the secret-key data are located at the previous moment comprises:

at a target node that does not store the secret-key data currently in the multi-node secret-key storing system, generating the pseudo-data that have a length equal to a length of the secret-key data and a same encoding mode as an encoding mode of the secret-key data, replacing the pseudo-data at the target node when the secret-key data migrate to the target node, and re-generating the pseudo-data when the secret-key data migrate away from the target node.

* * * * *